United States Patent [19]

Bolli

[11] Patent Number: 5,042,096
[45] Date of Patent: Aug. 27, 1991

[54] WATER-SAVING TOILET FLUSHER

[76] Inventor: Michael C. Bolli, 333 W. Lansdowne Ave., Orange City, Fla. 32763

[21] Appl. No.: 492,842

[22] Filed: Mar. 13, 1990

[51] Int. Cl.$^5$ .............................................. E03D 1/14
[52] U.S. Cl. .................................................. 4/326
[58] Field of Search .................. 4/324, 325, 326, 327, 4/412, 413, 414, 415; 137/430, 433, 441

[56] References Cited

U.S. PATENT DOCUMENTS

| | | | |
|---|---|---|---|
| 1,671,361 | 5/1928 | Frankenberger | 137/441 |
| 1,787,601 | 1/1931 | Swanberg | 137/441 X |
| 3,744,064 | 7/1973 | Preston | 4/325 |
| 3,758,893 | 9/1973 | Smolinski et al. | 4/327 |
| 4,056,856 | 11/1977 | Reid et al. | 4/326 |
| 4,096,591 | 6/1978 | Awis | 4/326 |
| 4,145,775 | 3/1979 | Butler | 4/415 |
| 4,172,299 | 10/1979 | del Pozo | 4/326 |
| 4,175,295 | 11/1979 | Cameron | 4/327 |
| 4,837,867 | 6/1989 | Miller | 4/324 |

*Primary Examiner*—Henry J. Recla
*Assistant Examiner*—Robert M. Fetsuga
*Attorney, Agent, or Firm*—Edward M. Livingston

[57] ABSTRACT

A toilet tank 13 is provided with a bottom flapper 5 in valved relationship to a tank outlet 6 attached at an angle from an overflow pipe 8 or directly above the tank outlet 6 at the bottom of the tank 13 and a top flapper 9 in valved relationship to the end of a top-level outlet pipe 10 that is offset at an angle from the overflow pipe 8 which is extended vertically from a side of the outlet orifice 6. A bottom flexible line 1 is attachable at one end to the bottom flapper 5 and to a flush rod 3 at the opposite end for pulling the bottom flapper 5 up to open the tank outlet 6 by operation of a swivelable flush handle 11. A top flexible line 2 is attachable to a top flapper 9 at the end of the top outlet pipe 10, threaded through a line eye 7 at the top of the overflow pipe 8 and then attachable to an end section 4 of the flush rod 3. Swiveling the flush handle 11 slightly in opposite directions up or down causes the two flappers 5 and 9 to be operable separately as valves. All water in the tank 13 is released when the flush handle 11 is swiveled downward for use in flushing solid water. But only the water above the top flapper 9 is released when the handle 11 is swiveled upward for use in flushing liquid water. A separate control valve 25 assures that there will be no water wasted for toilet-bowl water-seal effect at both levels of flushing. All parts can be retrofitted to conventional toilet flushing tanks. The user of this flusher will save more than three (3) gallons per each flush when the flush handle is swiveled upwardly when disposing of liquid water.

3 Claims, 3 Drawing Sheets

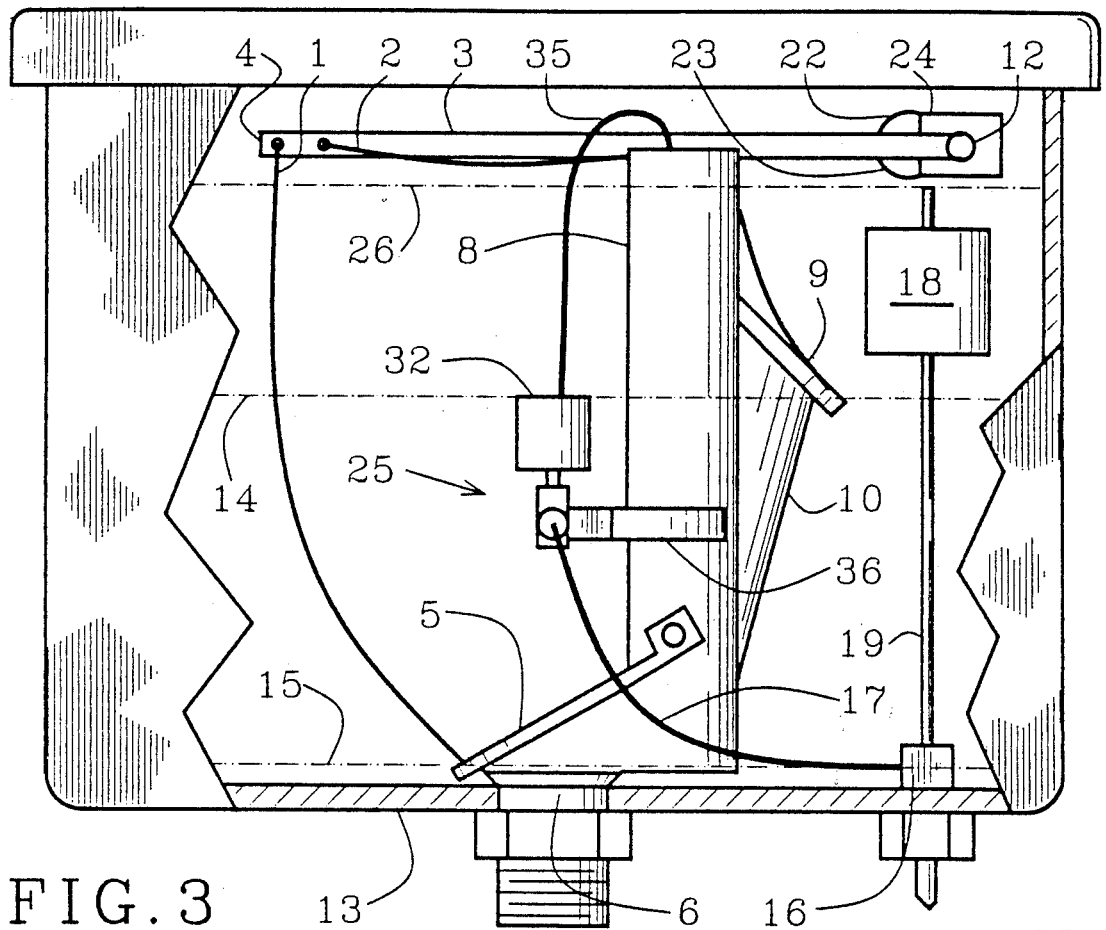
FIG. 3
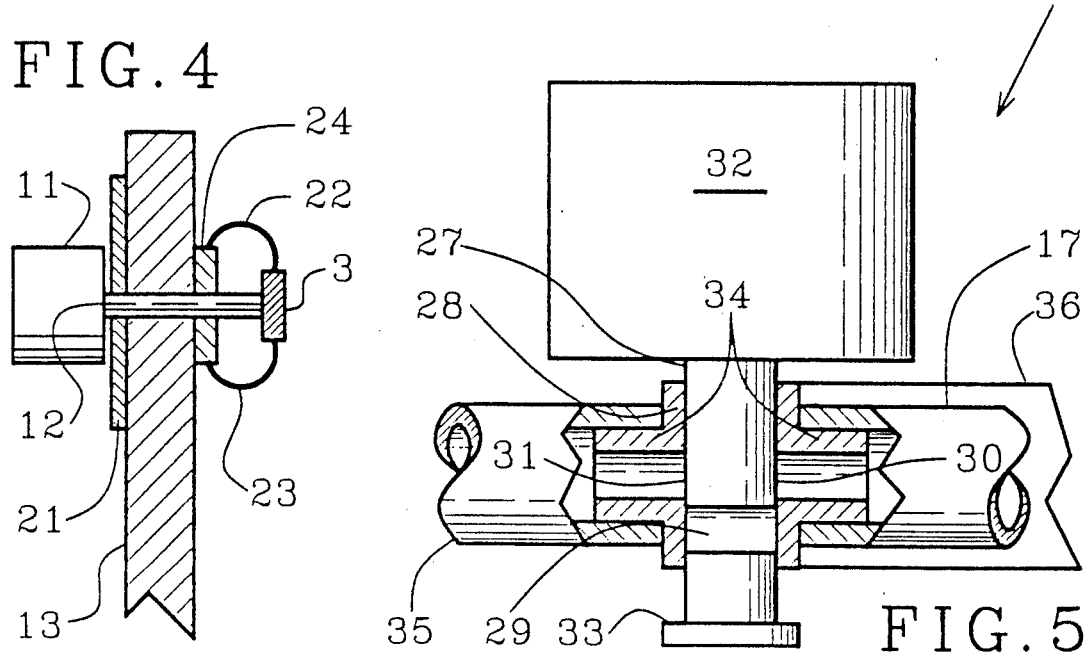
FIG. 4
FIG. 5

WATER-SAVING TOILET FLUSHER

BACKGROUND OF THE INVENTION

This invention is related to water-saving toilet-flushing mechanisms and in particular to dual-level evacuation pipes and related water-flow control for flushing toilet tanks.

Current flushing toilets use excessive amounts of water whenever flushed, particularly for liquid wastes. In fact, present toilets use approximately five (5) gallons per flush regardless of the amount of water needed to properly flush the toilet. A variety of dual-level evacuation pipes have been Examples known by Applicant include the following U.S. Pat. Nos.:
4,353,138 Bell (1982)
4,175,295 Cameron (1979)
4,172,299 del Poze (1979)
4,122,564 Addicks et al. (1978)
4,042,982 Contreras (1977)
3,903,551 Johnson (1975)
3,768,103 Robinson (1973)
1,963,211 Patterson (1934)

All of these patents have contributed to understanding problems involved in minimizing water used for flushing toilets. However, none has been sufficiently convenient and low-cost to become widely used. The first water-saving toilet patented with a dual-level evacuation pipe was in 1934. Under the circumstances at that time, minimizing water-use to prevent filling sewage tanks and drain fields was a problem. In effect, the waste-disposal problem of the world has become similar in ways to localized sewage-tank and drain-field conditions of several generations previous. Civilization is repeating itself. Now again, the need is urgent. Both state and federal legislation are being considered for demanding water-saving toilet flushers and a search is on for the most economical, convenient and reliable one.

The objective of a dual-level evacuation column or pipe is to provide a full tank for flushing solids from the toilet bowl and to provide a partial tank of water for flushing liquids and other light flushing loads. In comparison to the known prior art, applicant's dual-level evacuation column provides for a larger outlet orifice immediately above a pipe leading from the flushing tank to the toilet bowl. This diminishes water resistance and makes it possible to get a good flush with the least amount of water as a result of fast inflow of water into the toilet bowl. It can be adapted at lower cost for parts and for labor either to adapt existing toilets or to produce them initially. It also provides for minimizing the amount of water used for filling a toilet bowl to a level that seals out sewage-pipe odors at the vertical outlet curve in the drain pipe. These are substantial advantages in light of how much advancement is required to prompt change, even when the need is great.

The Patterson patent granted in 1934 was costly, complicated and required a manual pulling of a flush handle outwardly from the water tank in addition to the turning of the flush handle either upwards for light flushing or downward for full flushing. The Bell U.S. Pat. No. 4,353,138, granted in 1982 was relatively simple but required a new handle adaptation that is not required by the applicant's dual-level flushing mechanism. The Cameron U.S. Pat. No. 4,175,295, 1979, was very simple and reliable, but it too required new handle means and it did not have a direct outlet of water that would facilitate flushing with the least amount of water. The del Pozo U.S. Pat. No. 4,172,299, 1979, came closer to the present invention, but did not achieve providing a direct outlet of water above the tank outlet pipe and it also was very simple, but it too required a new handle mechanism for its installation and it operated differently than applicant's device. The Addicks et al. U.S. Pat. No. 4,122,564, 1978, operated differently than applicant's device in that a lower-level outlet valve was actuated by a lever at the opposite side of a fulcrum from the valve by upward rotational movement of the handle and the top valve was operated conventionally. Other patents mentioned above and still others known of are constructed differently than applicant's device. These prior such devices are more expensive to retrofit or to construct initially and are less advantageous for encouragement of their use.

SUMMARY OF THE INVENTION

A major object of this invention is to save water used for flushing toilets by using less water for flushing liquids than for flushing solids from toilets.

Another object is to provide a dual-level flushing column with minimal restriction of water from a flushing tank to a toilet bowl in order to assure effective flushing with least possible water for flushing solid wastes.

Another object is to assure the proper amount of water for filling the toilet bowl to water-sealing exit level for both flushing levels.

Another object is to provide a low-cost and reliable conversion kit for retrofitting existing toilets.

Another object is to provide low-cost and reliable original-equipment-manufacturing parts at low cost.

A toilet tank is provided with a bottom flapper valve attached to a tank outlet orifice at the bottom of the tank. A top flapper valve is provided at the end of an upper outlet pipe that is offset at an angle from an overflow pipe which is extended vertically from a side of the outlet orifice. A first flexible line is attachable at one end to the bottom flapper and to a flush rod at the opposite end for pulling the bottom flapper valve open from the tank outlet orifice by operation of a swivelable flush handle. A second flexible line is attachable to a flapper at the end of the upper outlet pipe, threaded through an eye orifice at the top of the overflow pipe and then attachable to the flush rod. Swiveling the flush handle slightly in opposite directions up or down causes the two valves to be operable separately as a result of direction-change effect of the eye orifice through which the second flexible line member is threaded. All water in the tank is released when the flush handle is swiveled downward. But only the water above the top flapper is released when the handle is swiveled upward. A separate control valve assures that there will be no water wasted for water-seal effect at both levels of flushing. All parts can be retrofitted to conventional toilet-flushing tanks. Use methods are also provided.

These and other features and advantages of this invention will be apparent from drawings and descriptions of preferred embodiments in relation to claim descriptions that follow.

BRIEF DESCRIPTION OF THE DRAWINGS

FIG. 3 is a cutaway rear elevation view of the embodiment illustrated in FIGS. 1 and 2 with the additional features of a water valve for preventing excess water from flowing into a toilet bowl to effect a water-seal of the toilet-bowl outlet when flushing with a full tank of water;

FIG. 4 is a cutaway section view of a flusher handle and flush-rod axle in relation to a flush-rod and resilience means to keep the handle and flush-rod centered when not actuated in either direction;

FIG. 5 is a cutaway side view of a water inlet control valve to prevent excessive water from entering a toilet bowl for a water-seal with a full-tank flushes while providing the correct amount of sealing water for both partial-tank and full-tank flushes.

DESCRIPTION OF PREFERRED EMBODIMENTS

Figure 1:
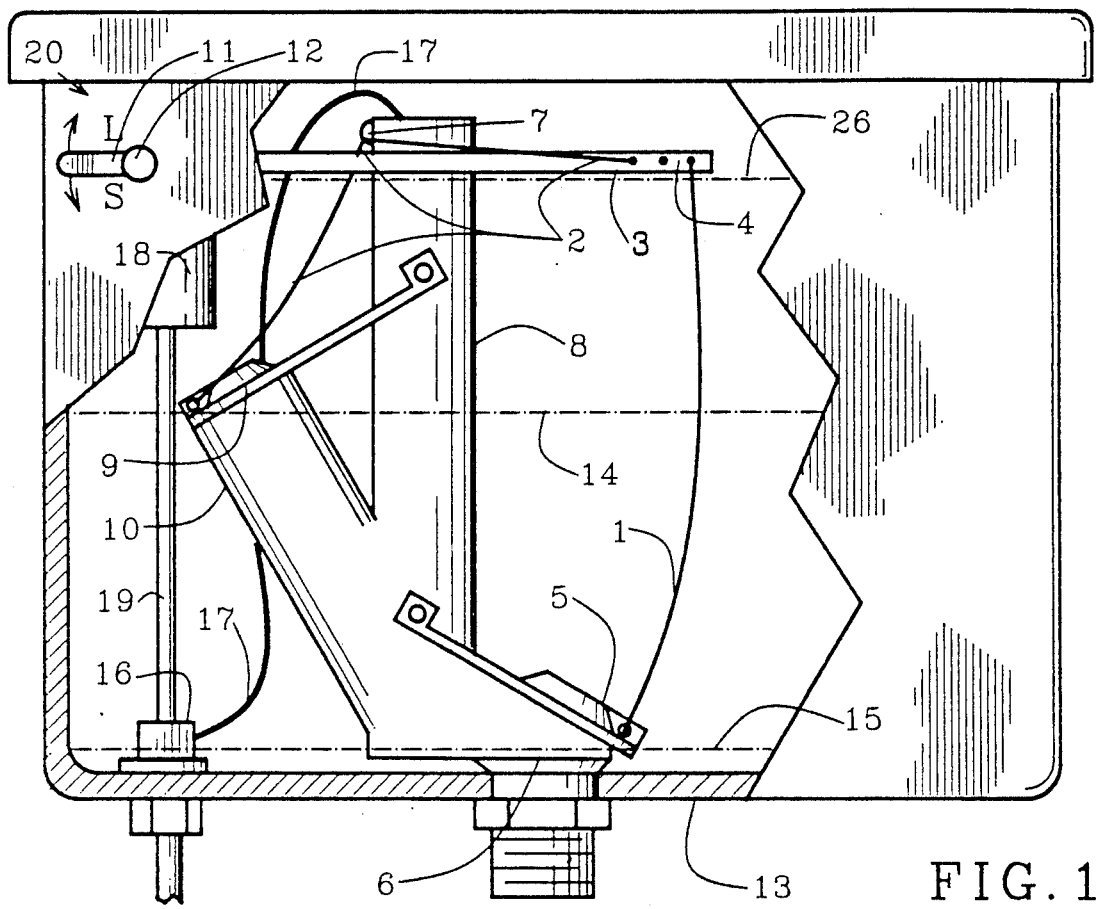
FIG. 1 is a cutaway front elevation view of a conventional toilet water tank illustrating the particular features of a flapper valve directly above a tank outlet for a dual-level flusher in an embodiment of the invention employed in conjunction with the increasingly-popular vertical-rod-mounted float for operation of a water-inlet valve.
Figure 2:
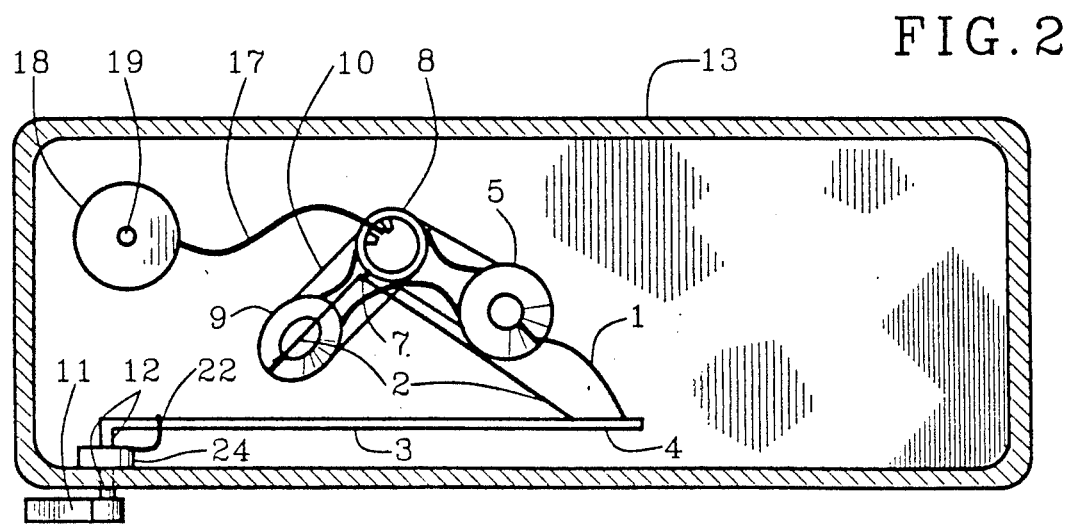
FIG. 2 is a top plan view of the embodiment illustrated in FIG. 1 for all known types of float-valve toilet-flushing systems.

Referring to FIGS. 1 and 2, a bottom flexible valve line 1 and a top flexible valve line 2 are both attached to a flush rod 3 in the vicinity of a flush-rod end section 4. The flexible valve line 1 and 2 can be constructed of any suitable flexible material or form of flexible line, such as chains, wire cable, plastic cable and ball-type chains The bottom valve line 1 is attached at its opposite end to a bottom valve flapper 5 that as shown, may be positioned and operable directly above tank outlet 6. The top valve line 2 is threaded through the orifice of line eye 7 at the top of overflow pipe 8 and attached to top valve flapper 9 that can be caused to open top-level outlet pipe 10 that is extended at an angle from the overflow pipe 8 which is extended vertically from a side of the outlet orifice 6. When flush handle 11 is pushed downward, the flush-rod end section 4 is pivoted upward by means of being positioned at the opposite side of handle axle 12 from the handle 11 The axle 12 acts as a pivot or class-one type of fulcrum point. Upward-movement pivoting of the flush rod 3 causes the bottom valve flapper 5 to be pulled directly the same as conventional flushing valves. When flush handle 11 is pushed upward, the flush-rod end section 4 travels downward and pulls top line 2 to cause top flapper 9 to be raised to open top-level outlet pipe 10.

When the top flapper 9 is raised, water in tank 13 will flow through the top-level outlet pipe 10 and out tank outlet 6 and overflow pipe 8 until the level of the water reaches upper water-level line 14. The amount of water discharged down to this upper water-level line 14 will be sufficient for flushing liquids and light small particles from a toilet bowl. This liquid-flushing level can be one-half-to-one-fourth of the total amount of water available in the tank 13 for flushing or some other proportion as determined to be most appropriate for particular forms, shapes and relative sizes of toilet bowls.

When the bottom flapper 5 is raised, a full tank of water in tank 13 will be discharged through tank outlet 6 for flushing solids from a toilet bowl. Flushing water will continue to flow until bottom-water-level line 15 is reached and only a small amount of water remains in the tank 13.

After being discharged through either the top-level outlet pipe 10 or through the tank outlet 6 directly, replacement water will be directed into the tank through conventional inlet water valving 16. Water from the inlet valving 16 is directed also through sealing-water conveyance tubing line 17 into the overflow pipe 8 and discharged into a toilet bowl through tank outlet 6 for restoring a water-seal in a toilet bowl. There are different types of water-valving 16 for different types of conventional float-control valves, but they all provide the same functional feature in relationship to this invention.

An "S" for solids down and an "L" for liquids up, both indicated 20, can be written on the front of the tank as illustrated in FIG. 1 or on a direction plate 21 with a cross-section view illustrated in FIG. 4.

Figure 6:
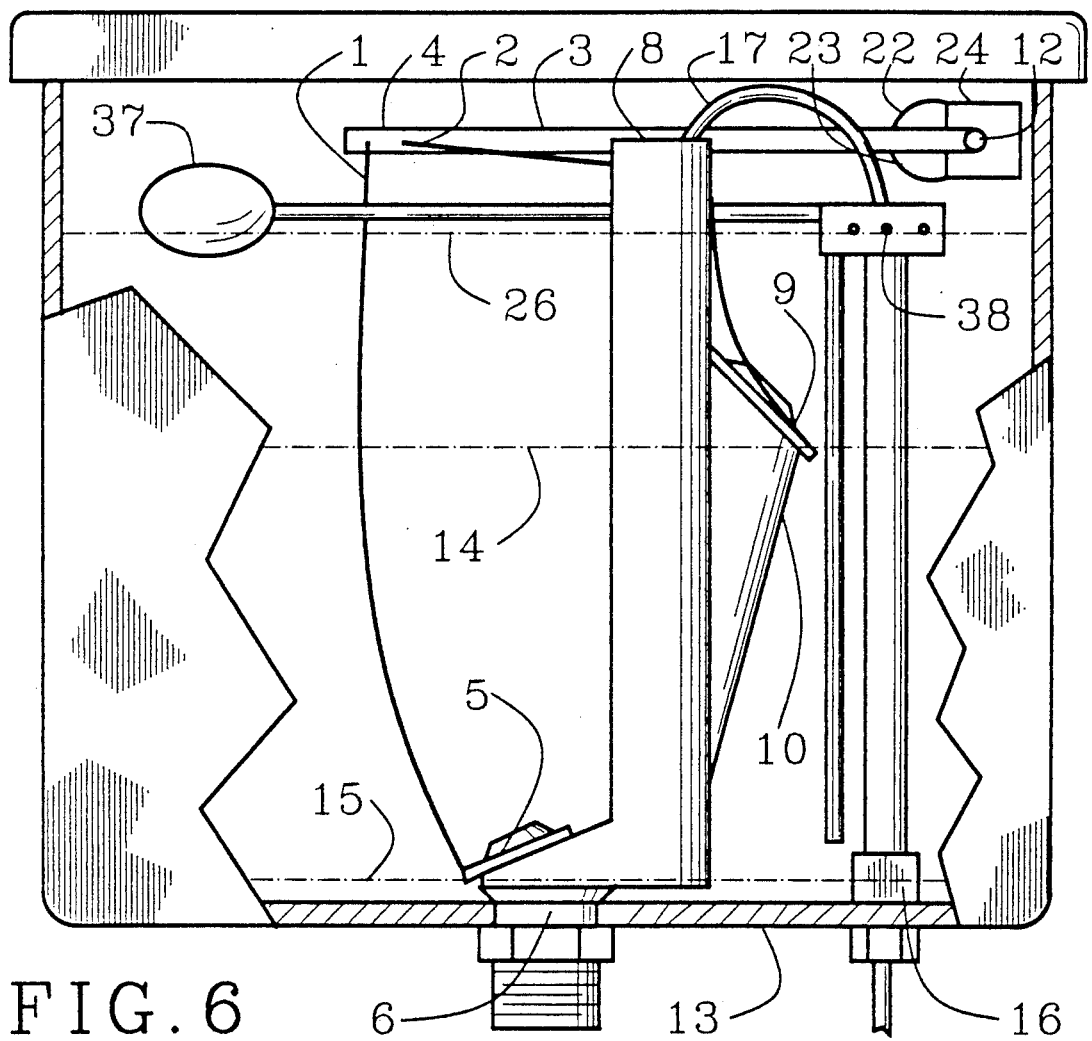
FIG. 6 is a cutaway rear elevation view of the invention employed with a conventional horizontally-mounted float valve.

Illustrated in FIGS. 1-3 is the invention being employed with a conventional vertical-float-controlled inlet-water valve 16. FIG. 6 illustrates its use with a conventional horizontal-float-controlled inlet valve 16.

Referring to FIGS. 3, 4, and 5, an upper resilient member 22 and a lower resilient member 23 or both combined in opposing action can be attachable to a resilience-anchor member 24 solidly attachable to tank 13 to cause the handle 11 to remain between up and down position until actuated manually in either direction. Alternatively, the resilience means can be attached directly to a wall of the tank 13. The resilience member or plurality of members 22 and 23 can be metal springs, rubber-type material or other resilience means.

Some conventional flush-handle axles 12 are provided with restriction means to permit downward movement or swiveling of the handle 11 but to prevent its upward movement. Whatsoever form of such restriction is employed must be removed sufficiently to allow upward as well as downward movement of the handle 11.

A water-seal control valve 25 can be employed to prevent waste of water for causing a water-seal at the conventional type of vertical curve in a toilet-bowl outlet. If the flow-rate of water for causing a water-seal is the same while the tank 13 is being filled from the bottom level 15 to the full-tank-level line 26 as for when the tank 13 is being filled from the upper level 14 to the full-tank-level line 26, then there will be either (a) a waste of more water than is required for causing a water-seal when the tank 13 is being filled from the lower level or (b) inadequate water for causing a water seal when the tank 13 is being filled from the upper level 14. The latter is a water-loss separate from loss of water from a full-tank flush when a partial tank flush would be adequate. It is a problem that is not solved adequately in the prior art of dual-level flushing.

The solution provided by control valve 25 is to shut off or restrict flow of water for the water-seal when the tank 13 is being filled below the upper level and to provide flow at a sufficient flow-rate to cause a water-seal when the tank 13 is being filled from the upper level to the tank-full level 26.

The water-seal control valve 25 is provided with a plunger shaft 27 that is slidable vertically in valve cylinder 28. A plunger orifice 29 allows flow from cylinder inlet port 30 to cylinder outlet port 31 through the plunger orifice 29 when the plunger shaft 27 is raised by float 32 to where the plunger orifice 29 is partially or fully in line with or concentric with cylinder inlet and outlet ports 30 and 31 respectively. With a plunger shoulder 33, the plunger shaft 27 is prevented from being pulled upward too far or out of the cylinder as a result of upward pressure from the float 32. A sealing-water conveyance line 17 can be attached to a valve-tube connection pipe 34 at either the inlet port 30 or the outlet port 31 for operation of the valve in either direction. A sealing-water transfer line 35 can be attached to whichever valve-tube connection pipe 34 that the sealing-water conveyance line 17 is not attached to. The transfer line 35 then is positionable to convey water in the overflow pipe 8 from the water-seal control valve 25. The inlet-water valving 16 prevents flow of water through the control valve 25 after the tank has been filled.

A valve-attachment member 36 can be provided to attach the valve 25 to the overflow pipe 8 or to a wall of the tank 13 or other member at a position adjustable vertically for assuring the proper amount of water for both levels of flushing in relation to the flow-rate of sealing water from the inlet-water valving 16 to the control valve 25. The valve-attachment member 36 an be a "C" clamp attachable with resilience to the outside periphery of the overflow pipe 8.

Referring to FIG. 6, any type of conventional water-inlet valve such as one with a horizontally-operable toilet tank float 37 can be operated either without the valve 25 as illustrated in FIG. 6 or with it as illustrated in FIG. 3. Whether either the vertical or horizontal float valves or any other type of valve is employed in a toilet-tank float-controlled system, the sealing-water conveyance line 17 is attached to a sealing-water outlet connection at the water-inlet valve 20. When the valve 25 is not employed, the size of a tank-filling orifice adjustment 38 or valving can be adjusted for achieving the nearest-possible amount of flow required for water-seal for both levels of flushing.

This invention is intended to be used either as a replacement kit for retrofitting existing toilet tanks or as original equipment. All modifications, forms and alterations of this invention forseeable within the scope of this invention are included in the following claims.

Having described the preferred embodiments of my invention, I claim:

1. A dual-level toilet flusher comprised of:
   a selectively large-diameter outlet orifice positionable centrally in the bottom of a toilet tank;
   an overflow pipe having approximately the same diameter as the bottom outlet orifice and extended vertically therefrom to a select position in relation to a predetermable tank-full level in the tank;
   a bottom flapper valve in valve-sealable relationship to the bottom output orifice and attachable swivelably to the overflow pipe;
   a top-level outlet pipe extended outwardly from the overflow pipe at a select angle upwards from the vicinity of the bottom outlet orifice to a select upper level of water discharge from the tank;
   a top flapper valve in valve-sealable relationship to a top-level outlet orifice in the top-level outlet pipe and attachable swivelably to the overflow pipe;
   a flush rod and a flushing handle attachable rigidly at opposite sides of a tank wall by a flush-handle axle that is rotatable in selective arcs of partial rotation by selective up-and-down motion of the flushing handle;
   a bottom-flapper flexible line having one end attachable to the bottom flapper and the opposite end attachable to an end section of the flusher rod;
   a top-flapper flexible line extending through an orifice in a line eye attachable to the overflow pipe above the top flapper valve and with one end of the top-flapper flexible line attachable to the top flapper and the opposite end attachable to the end section of the flush rod such that downward swiveling of the flush handle causes upward travel of the flush rod to pull the bottom flapper open upwardly from the bottom outlet orifice and upward swiveling of the flush handle causes downward travel of the flush rod to pull the top flapper to open upwardly from the top-level outlet orifice;
   water-inlet valving having a sufficiently-large outlet orifice for distribution of water to a toilet bowl for effecting a water-seal in a vertically-curved outlet from the toilet bowl during time that water is directed from the water-inlet valving to the tank for filling the tank;
   a conveyance in fluid-communication relationship with said sufficiently large outlet orifice for distribution of water to a toilet bowl for effecting a water-seal in vertically-curved outlet from the toilet bowl;
   a water-seal flow-control valve in said conveyance at a select position vertically in relation to water level in the tank for detection of water level for regulation of flow water through said conveyance to accomplish a water-seal in said vertically curved outlet without allowing more water to flow through the said conveyance than is necessary for accomplishing said water-seal;
   wherein said water-seal flow-control valve comprises a cylinder;
   a float having a shaft extending downwardly from the float and in slidable relationship to the inside periphery of the cylinder;
   an inlet conveyance connector at an inlet port in a wall of the cylinder;
   an outlet conveyance connector at an outlet port in a wall of the cylinder; and
   an orifice through the shaft in fluid-communication relationship from the inlet port to the outlet port when the float is in a selectively raised position and the orifice in the shaft is not in fluid-communication relationship between the inlet port and the outlet port when the float and the shaft are in a selectively lowered position.

2. A dual-level toilet flusher according to claim 1 and further comprising:
   a means for attachment of the water-seal flow-control valve to the overflow pipe with select vertical positioning.

3. A method for using a dual-level toilet flusher consisting of:
   a selectively large-diameter outlet orifice positioned centrally in the bottom of the tank;
   an overflow pipe having approximately the same diameter as the outlet orifice and extended vertically to a select position in relation to a predeterminable tank-full level in the tank;
   a bottom flapper valve in valve-sealable relationship to the outlet orifice and attachable swivelably to the overflow pipe;
   a top-level outlet pipe extended outwardly from the overflow pipe at a select angle upwards from the vicinity of the outlet orifice to a select upper level of water discharge from the tank;

a top flapper valve in valve-sealable relationship to a top-level outlet orifice in the top-level outlet pipe and attachable swivelably to the overflow pipe;

a flush rod and a flushing handle attachable rigidly at opposite side of the tank wall to a flush-handle axle that is rotatable in selective arcs of partial rotation by selective up-and-down motion of the flushing handle;

attachable to the bottom flapper and the opposite end attachable to an end section of the flusher rod;

a top-flapper flexible line extendable through an orifice in a line eye with one end of the top-flapper flexible line attachable to the top flapper and the opposite end attachable to the end section of the flush rod such that downward swiveling of the flush handle causes upward travel to pull the bottom flapper open upwardly from the bottom outlet orifice and upward swiveling of the flush handle causes the top flapper to open upwardly from the top-level outlet pipe;

water-inlet valving having a sufficiently-large outlet orifice for distribution of water to a toilet bowl for effecting a water-seal in a vertically-curved outlet from the toilet bowl during time that water is directed from the water-inlet valving to the tank for filling the tank from the top of the top-level outlet pipe to a tank-full level of water in the tank;

a conveyance in fluid-communication relationship between the said outlet orifice for distribution of water to a toilet bowl for effecting a water-seal in a vertically-curved outlet from the toilet bowl and the top of the out pipe; and a water-seal flow-control valve in the said conveyance at a select position vertically in relation to water level in the tank for detection of water level utilizing a float mounted therein for regulation of flow of water through the said conveyance to accomplish a water-seal in water-seal outlet means in a toilet bowl without allowing more water to flow through the said conveyance than is necessary for accomplishing said water-seal;

comprised of the following steps:

providing sufficient flow-rate of water from inlet-water valving for causing a water-seal in a toilet-bowl outlet during the time that a flushing tank is being filled from the upper water level line to the full-tank level line;

providing connectability between inlet water valving and a sealing-water connection conveyance line;

attaching the tank outlet to tank outlet plumbing with the top and bottom flappers assembled in operable relationship to the top-level outlet pipe and tank outlet respectively;

connecting the sealing-water conveyance line to one of the valve-tube connection pipes and the sealing-water transfer line to the other valve-tube connection pipe;

attaching the water-seal flow control valve at a position in relation to the inside of the tank that causes the float for regulation of the control valve to shut off flow of water for sealing a toilet bowl outlet when water in the tank is below the vicinity of the level of the top-level outlet pipe and to allow flow of water for sealing a toilet bowl outlet when water in the tank is above top-level outlet pipe;

attaching the top valve line to the top flapper, threading it through the line eye;

attaching the bottom valve line to the bottom flapper;

positioning the flush rod in suitable up-and-down swivelable relationship to the tank;

attaching the unattached ends of the top valve line and bottom line valve to the end section of the flush rod and;

positioning a terminal end of the sealing-water transfer line inside of the top of the overflow pipe to convey water from the control valve to the inside of the overflow pipe.

* * * * *